US009811146B2

(12) United States Patent
Worthington

(10) Patent No.: US 9,811,146 B2
(45) Date of Patent: Nov. 7, 2017

(54) OPPORTUNISTICALLY CHANGING DISPLAY BRIGHTNESS

(71) Applicant: Microsoft Technology Licensing, LLC, Redmond, WA (US)

(72) Inventor: Bruce Lee Worthington, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 34 days.

(21) Appl. No.: 14/675,961

(22) Filed: Apr. 1, 2015

(65) Prior Publication Data

US 2016/0291681 A1 Oct. 6, 2016

(51) Int. Cl.
*G06F 1/32* (2006.01)
*G09G 3/34* (2006.01)
*G09G 5/00* (2006.01)

(52) U.S. Cl.
CPC ......... *G06F 1/3265* (2013.01); *G09G 3/3406* (2013.01); *G09G 5/00* (2013.01); *G09G 2320/0626* (2013.01); *G09G 2330/021* (2013.01); *G09G 2360/144* (2013.01)

(58) Field of Classification Search
USPC .................................................. 345/690, 589
See application file for complete search history.

(56) References Cited

U.S. PATENT DOCUMENTS 6,618,042 B1  9/2003  Powell
7,535,453 B2  5/2009  Lee
8,358,298 B2  1/2013  Lee et al.
8,423,306 B2  4/2013  Duncan et al.
8,686,981 B2  4/2014  Barnhoefer et al.
8,872,753 B2  10/2014  Glen
(Continued)

FOREIGN PATENT DOCUMENTS

WO    WO 2014050841 A1    4/2014

OTHER PUBLICATIONS

"Inernational Search Report & Written Opinion issued in PCT Application No. PCT/US2016/023338", Mailed Date: May 24, 2016, 13 pages.

(Continued)

*Primary Examiner* — Jennifer Mehmood
*Assistant Examiner* — Deeprose Subedi
(74) *Attorney, Agent, or Firm* — Workman Nydegger

(57) ABSTRACT

Automatically changing the brightness of a display device. A method includes, while the display device is at a first brightness power output level, detecting a power saving event indicating that it is desirable to reduce overall power consumed by the display device. The method further includes continuing to operate the display device at the first power output level while attempting to identify a brightness power output level change triggering event. The brightness power output level change triggering event is an event that occurs that makes a change to the brightness power output level of the display device less perceptible to a user. The method further includes detecting a brightness power output level change triggering event. In response to detecting the brightness power output level change triggering event, the method includes changing the power output level of the display device to a second brightness power output level.

20 Claims, 12 Drawing Sheets

(56) References Cited

U.S. PATENT DOCUMENTS

| | | |
|---|---|---|
| 2006/0092182 A1 | 5/2006 | Diefenbaugh et al. |
| 2006/0227125 A1 | 10/2006 | Wong et al. |
| 2006/0236144 A1 | 10/2006 | Chao |
| 2006/0250385 A1 | 11/2006 | Plut |
| 2007/0002210 A1 | 1/2007 | Ho et al. |
| 2008/0165116 A1 | 7/2008 | Herz et al. |
| 2011/0014955 A1 | 1/2011 | Kim et al. |
| 2011/0080422 A1* | 4/2011 | Lee ............ G06F 1/3203 345/589 |
| 2011/0260958 A1 | 10/2011 | Shabel et al. |
| 2011/0267324 A1 | 11/2011 | Stephens |
| 2012/0019492 A1 | 1/2012 | Barnhoefer et al. |
| 2012/0218282 A1 | 8/2012 | Choboter et al. |
| 2013/0076712 A1* | 3/2013 | Zheng ............ G01J 1/32 345/207 |
| 2013/0088523 A1* | 4/2013 | Wu ............ G09G 3/3611 345/690 |
| 2015/0138122 A1* | 5/2015 | Cho ............ G09G 3/3406 345/173 |
| 2015/0282071 A1 | 10/2015 | Nakaya et al. |
| 2016/0104434 A1* | 4/2016 | Matsui ............ G09G 3/3406 345/690 |

OTHER PUBLICATIONS

Iyer, et al., "Energy Adaptive Display System Designs for Future Mobile Environment", In Proceedings of the 1st international conference on Mobile systems, applications and services, May 5, 2003, 15 pages.

Graziano, Dan., "Four tips for improving battery life on the Galaxy S5", Published on: May 8, 2014 Available at: http://www.cnet.com/how-to/four-tips-for-improving-battery-life-on-the-galaxy-s5/.

Gibbs, et al., "How to extend your iPhone or Android's battery life", Published on: Jul. 9, 2014 Available at: http://www.theguardian.com/technology/2014/jul/09/how-to-extend-iphone-android-battery-life.

"Windows 7 Power Management", Published on: Apr. 2009 Available at: http://www.destinationgreenit.com/wp-content/uploads/windows7_power_management_whitepaper.pdf.

Ranganathan, et al., "Energy-Aware User Interfaces and Energy-Adaptive Displays", In Proceedings of Computer, vol. 39, Issue 3, Mar. 2003, pp. 31-38.

"Second Written Opinion Issued in PCT Application No. PCT/US2016/023338", Mailed Date: Sep. 2, 2016, 6 Pages.

"International Preliminary Report on Patentability Issued in PCT Application No. PCT/US2016/023338", Mailed Date: Feb. 15, 2017, 9 Pages.

* cited by examiner

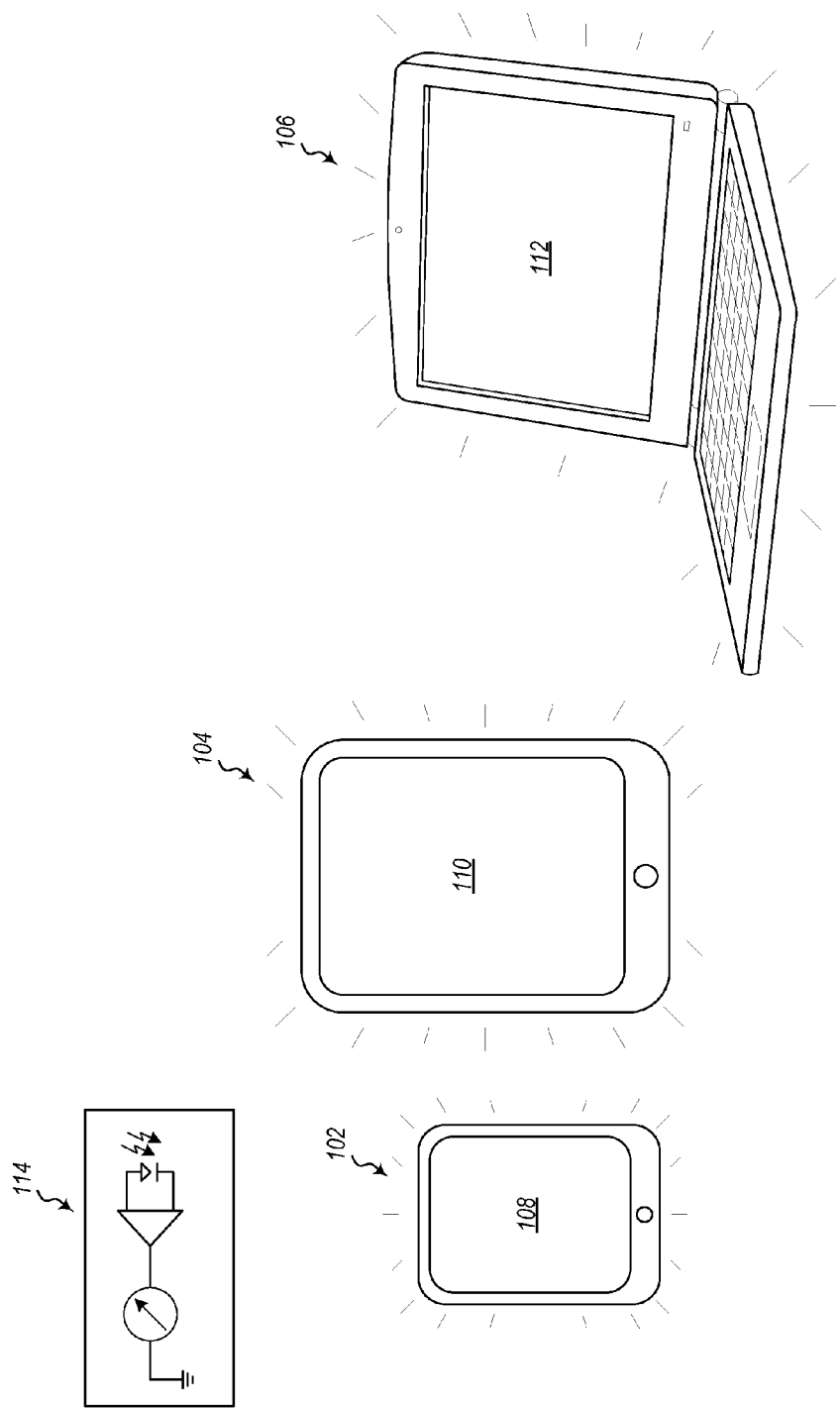

OPPORTUNISTICALLY CHANGING DISPLAY BRIGHTNESS

BACKGROUND

Background and Relevant Art

Computers and computing systems have affected nearly every aspect of modern living. Computers are generally involved in work, recreation, healthcare, transportation, entertainment, household management, etc.

For battery-powered devices with displays, the energy consumed by the displays typically constitutes a large fraction of the total power draw of the system (when the display device is on). In some cases the user may proactively or reactively reduce the display device brightness to save power, but it is also possible for the OS to save energy by autonomously decreasing brightness. However, if this is done suddenly, the experience can be jarring. Even if it is done gradually (e.g. a slow fade), it can also be an unpleasant experience.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for automatically changing the brightness of a display device. The method includes, while the display device is at a first brightness power output level, detecting a power saving event indicating that it is desirable to reduce overall power consumed by the display device. The method further includes continuing to operate the display device at the first power output level while attempting to identify a brightness power output level change triggering event. The brightness power output level change triggering event is an event that occurs that makes a change to the brightness power output level of the display device less perceptible to a user. The method further includes detecting a brightness power output level change triggering event. In response to detecting the brightness power output level change triggering event, the method includes changing the power output level of the display device to a second brightness power output level.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 1A illustrates various devices at a first display brightness power level;

DETAILED DESCRIPTION

To save battery life, there may be times when a piece of hardware, firmware, or software takes one or more actions that will reduce overall system power but may also have some consequences in regards to the performance of the system or other user experience aspects. For example, there can be a "battery saver" mode on a device that reacts to decreasing battery energy levels by engaging one or more remediations. One such remediation can be to reduce the power consumed by some display on the device, as these components often represent a large portion of power draw on the battery.

If the brightness is abruptly reduced to save power, the experience can be jarring—even if the user has previously configured the system to reduce brightness when reaching some remaining battery level. Embodiments herein can identify specific triggering events where the brightness can be reduced with less likelihood of the user noticing, or being adversely affected by the change. Additionally, some embodiments may reduce display power gradually at different triggering events. Thus, in some embodiments, a gradual decrease in brightness over time may occur, but not necessarily a predefined reduction (such as a linear or other predictable reduction) over time until the desired level is reached, but rather in incremental steps which occur at some triggering event.

Figure 1B:
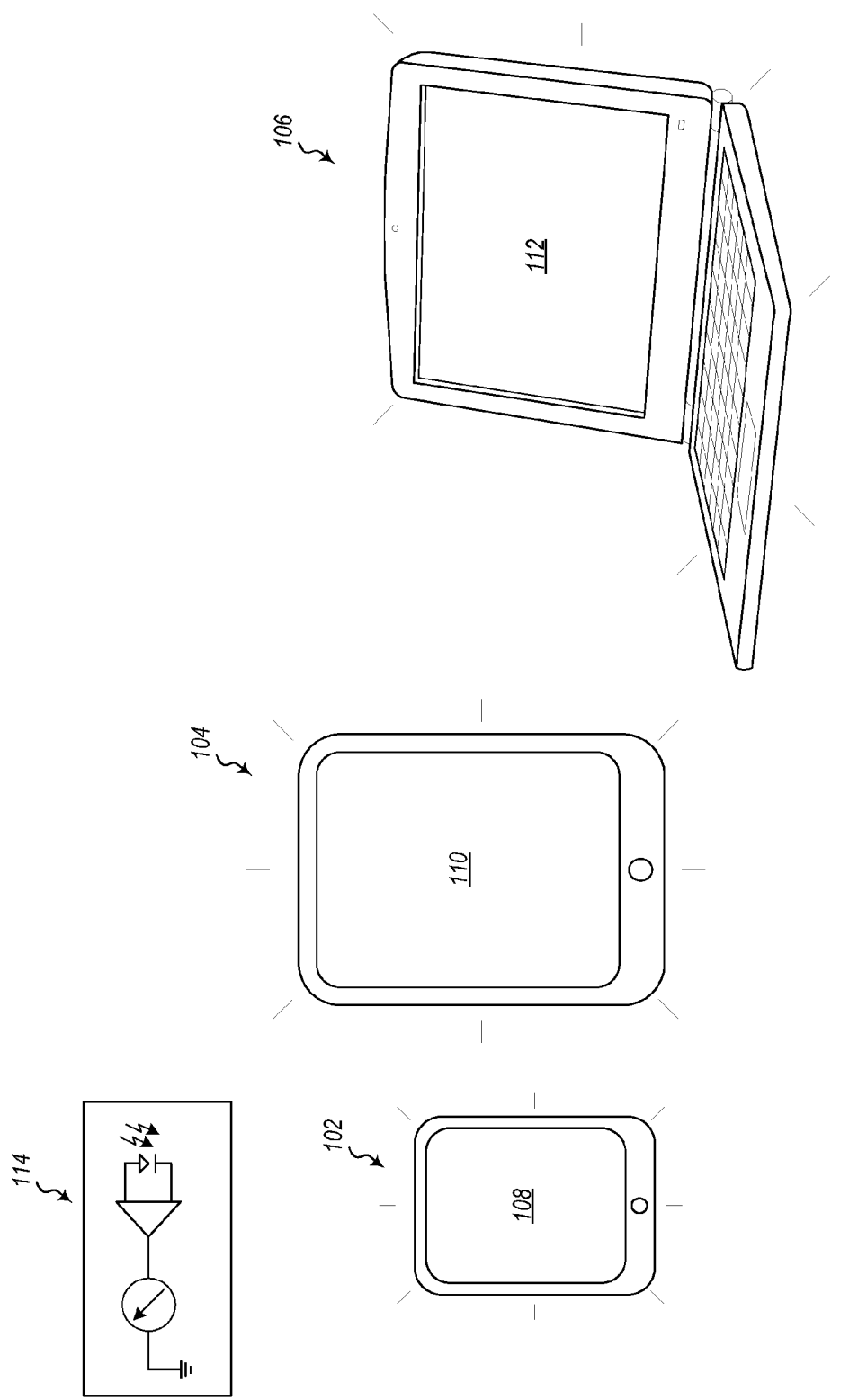
FIG. 1B illustrates the various devices at the second display brightness power level.

Referring now to FIGS. 1A and 1B, various devices are illustrated including a smart phone 102, a tablet 104 and a laptop 106. Each of the devices 102, 104 and 106 include a display device 108, 110, and 112 respectively. In FIG. 1A, each of the display devices is at a first brightness power output level as illustrated by the light sensor 114. In FIG. 1B, each of the display devices is at a second brightness power output level as illustrated by the light sensor 114. In the example illustrated, the brightness of the display devices in FIG. 1B is lower than the brightness of the display devices in FIG. 1A and thus the second brightness power output level is lower than the first brightness power output level. Less enemy is consumed at the second brightness power output level than the first brightness power output level.

While embodiments are likely to be implemented on a phone, it should be appreciated that embodiments can be applied to phones, tablets, laptops, wearable computers or even other devices. Embodiments can be implemented on any computing device with a display where it would be useful to implement power saving functionality.

Figure 2:
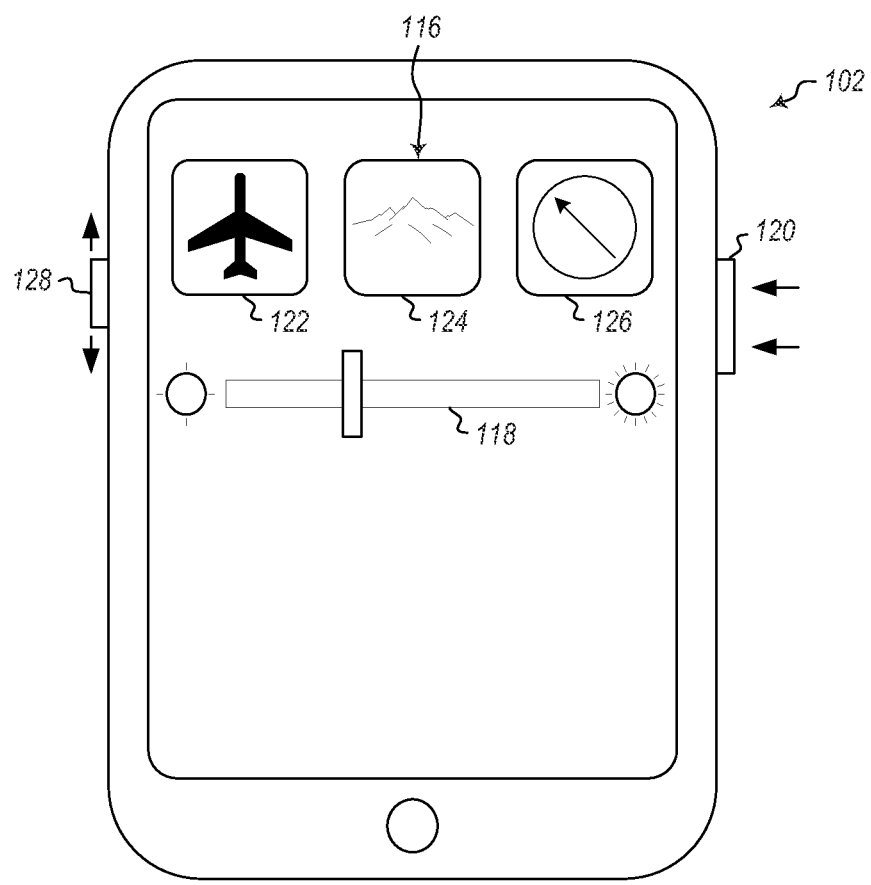
FIG. 2 illustrates a phone device with various user interface elements for controlling display device brightness

The energy consumed by displays (e.g., on phones, tablets, and laptops) typically has a major impact on battery life. Referring now to FIG. 2, in some cases the user may explicitly dial down the brightness to save power using system settings in a device. For example, FIG. 2 illustrates a phone 102. A user may be able to adjust display device 108 brightness manually. For example, a user may be able to use a slider 118 in a graphical user interface 116 to adjust display device brightness up or down. Alternatively, some devices include physical buttons on the device, such as the toggle button 120 that can be used to adjust display device brightness up or down.

However, it is advantageous for the system to be able to act on behalf of the user to reduce display power based on various factors, such as when the remaining battery level has dropped below some threshold or when it is otherwise determined that a device should enter a low power mode. For example, a power saving event may occur indicating that a device should enter a power saving mode. As indicated above, one such event may be battery power for the device dropping below a predetermined threshold.

Alternatively, a phone device may detect that cellular signal strength has dropped below a predetermined threshold. Thus, the device may determine that more power will be needed to sustain cellular communications, and thus, power should be lowered to the display to compensate for the additional power needed by the cellular communication system.

Similarly, a power saving event may be a device detecting that only certain types of cellular communication are available. Certain cellular communication modes require more power than other modes. When cellular communication modes that use more power than other modes available on the device are active, power may be reduced to the display to compensate for the additional power needed for the higher power cellular communication modes.

In yet another example, a power saving event may include detection of some condition of the device. For example, the device may detect a cellular or Wi-Fi network associated with an airline in-flight service. This causes the device to enter airplane mode, which is a low power mode. Thus, the power saving event may be detection of the network associated with an airline in-flight service (or other network that might indicate that low-power mode is appropriate).

In yet another example, a power saving event may be based on detection of a device location. In particular, certain locations may be locations where low power modes should be invoked. For example, backcountry explorers often have difficulties keeping devices charged when trekking in backcountry locations. The lengths of the excursions, combined with limited communication infrastructure often result in unwanted power drain from devices. However, some embodiments may be able to detect a power saving event based on when a device enters a backcountry boundary and may therefore wish to place a device in a low power mode, including lowing power to a display, when the device enters a backcountry area. This illustrates one location, however other locations can be imagined as well, such as movie theaters, houses of worship, convention centers, or other locations. Some embodiments may detect power saving events associated with locations where it is known that alternative sources of power for a device are sparse or unavailable or locations that are known to cause increased power drain on a device. Such boundaries may be detected using GPS, signal triangulation, network proximity, or other methods.

In other examples, power saving events may be based on manual user input. For example, FIG. 2 illustrates various graphical user interface elements 122, 124 and 126 that a user may be able to select to indicate that power saving is desired, and which when selected cause (or are) a power saving event. User interface element 122 illustrates an element that a user can select to place the phone 102 in airplane mode. Interface element 124 illustrates an element that a user can select to place the phone 102 in a backcountry mode. Interface element 126 illustrates an element that can be used by a user to generally select to place the phone 102 in a low power mode. FIG. 2 further illustrates a button 128 that generally indicates that the phone 102 should be placed in a low power mode. In the illustrated example, the button 128 is a sliding bi-stable button where one position indicates a power saving mode. Other buttons or user interface elements may be used in other embodiments.

Once a power saving event has been detected, it is desirable to reduce the power to the display. However, as noted above, it may be desirable to wait until a brightness power output level change triggering event occurs. In particular, it may be desirable to wait for an event to occur that would hide, or make less noticeable, a power reduction to the display.

There are several events that occur during normal usage that can be leveraged to reduce brightness in a manner the user is less likely to perceive or at least will not be as jarring an experience for them. These will be discussed in more detail below.

For a given workload on a given device, there may be specific behaviors that represent transitions between dramatically different screen contents. For example, a device may be operating at a first power level. Once a power saving event has occurred indicating that a device should go into a mode where less power is supplied to the display, thus reducing brightness of the display, embodiment can then continue to operate at the first power level while attempting to identify a triggering event. The triggering event is an event that occurs that can mask or reduce perception of a change to brightness of a display. Once the triggering event is detected after a power saving event had occurred, the power output level of the display can be changed to a second power level. The power output level is not always a lower power level, as will be explained in more detail for some embodiments, but generally moves the device towards lower power consumption for the display. However, it should be appreciated that embodiments may also be implemented in the other direction, that is, where the power saving event actually indicates that higher levels of power can be used. For example, a device may detect that battery power exceeds some level, that certain cellular or wireless networks are available, or some other event indicating that a device can use higher power to power the display.

Figure 3A:
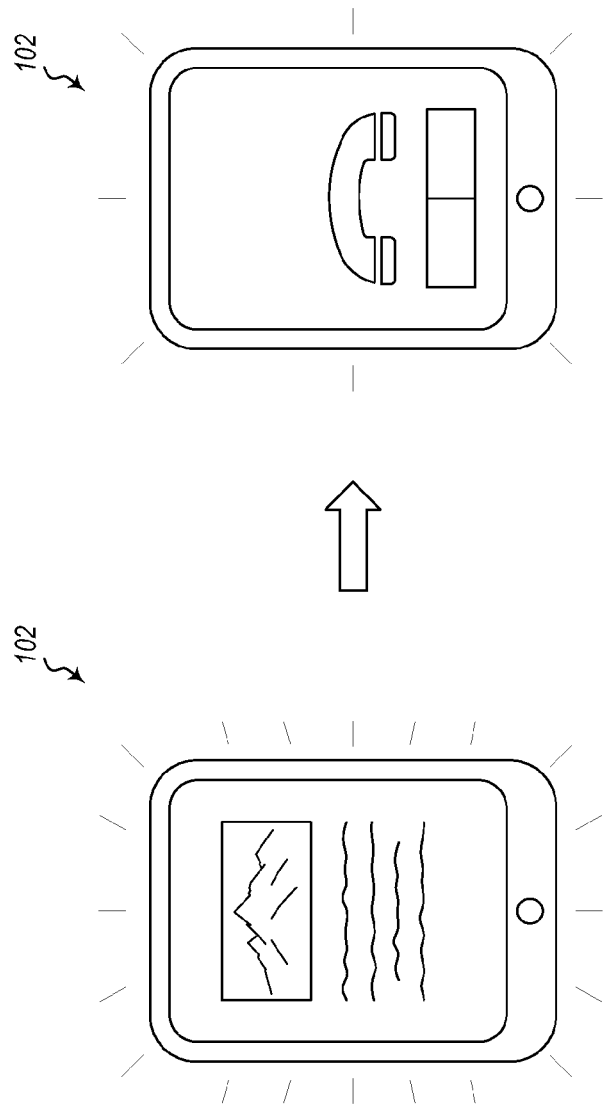
FIG. 3A illustrates a phone switching between applications.
Figure 4A:
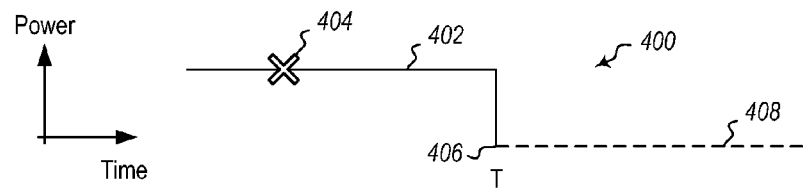
FIG. 4A illustrates a display power trace.

In some embodiments, the triggering event may be a device switching between applications or workloads. For example, the triggering event may be a device switching between the user display displaying a game vs. a phone call vs. a text message vs. a browser vs. a word processing application, etc. For example, FIG. 3A illustrates a phone 102 switching between a browser application and a phone call application. As the phone switches applications, the power level of the display can be switched from a first power level to a second, lower power level. In the example illustrated in FIG. 3A, the display is switched from a higher power level to a lower power level as indicated by the lower number of brightness tics on the phone 102 when the phone call application is active as compared to the browser application. Reference is also made to FIG. 4A which illustrates a power trace 400 showing relative power outputs to the display over time. The display is at a first power level 402. While at the first power level, a power saving event 404 (such as battery power being below a predetermined threshold) is detected. Power to the display continues to be provided at the first power level 402 while waiting for a triggering event. A triggering event 406, (in this case, an application switch) occurs. At the triggering event 406, power to the display is reduced to the second power level 408.

Figure 4B:
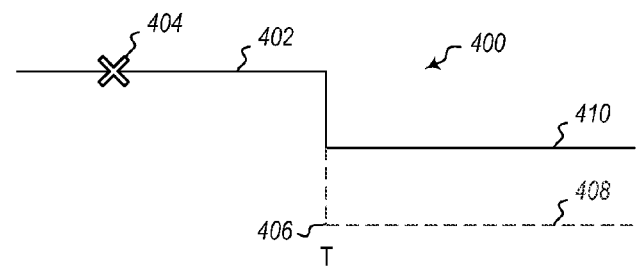
FIG. 4B illustrates another display power trace.

While FIG. 4A illustrates a simplistic example, it should be appreciated that determination of the second power level 408 may be more complex and dependent on various other factors. For example, a phone call application typically has less power provided to the display under ordinary circumstances, because it has a darker background color and higher contrasting foreground colors. When the majority of the display is dark, less power is provided under ordinary circumstances. FIG. 4B demonstrates this consideration. In particular, FIG. 4B illustrates a target power level 410 that would normally occur when switching from display conditions that require high power to display conditions that require lower power. However, in this case, the second power level 408 may be reduced even below the target power level 410. Alternatively, the second power level 408 may be at the same level as the target power level 410 and then the power level would not be increased (or at least not increased to the first power level) when switching back to an application that typically had higher power to the display.

Figure 4C:
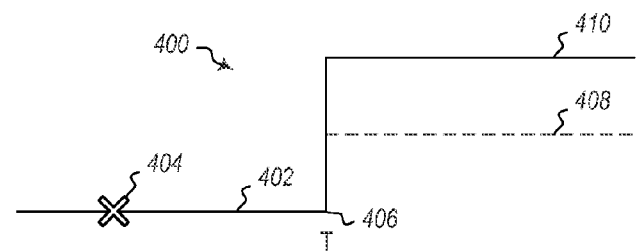
FIG. 4C illustrates another display power trace.

FIG. 4C illustrates an example where a device switches from an application that typically has lower power (i.e. first power level 402) to the display to an application that typically has higher power (i.e. target power level 410) to the display. In this case a power saving event 404 occurs. The power output is kept at the first power level 402 while waiting for a triggering event 406. When the triggering event occurs, the power output is actually increased to the second power level 408, but not to the target power level 410. Thus, an overall effective power decrease is accomplished. In some embodiments similar to this, power output to the display may not be increased at all at the triggering event 406 when power would normally be increased to the target power level 410. Subsequent power output to the display may simply be lower, thus accomplishing a reduction in power output to the display.

Similar to the example illustrated in FIG. 3A, embodiments may change power output levels when the triggering event comprises switching between applications and a logon/start/desktop screen. The considerations illustrated above for FIGS. 3A, 4A, 4B, and 4C may apply to these examples as well.

Similar to the example illustrated in FIG. 3A, embodiments may change power output levels when the triggering event comprises switching between phases of an application. For example, such phases may be between levels in a game, between user interface screens, navigating from one web page to a new web page, switching images in a photo application, scene changes in a video application, etc.

Figure 3B:
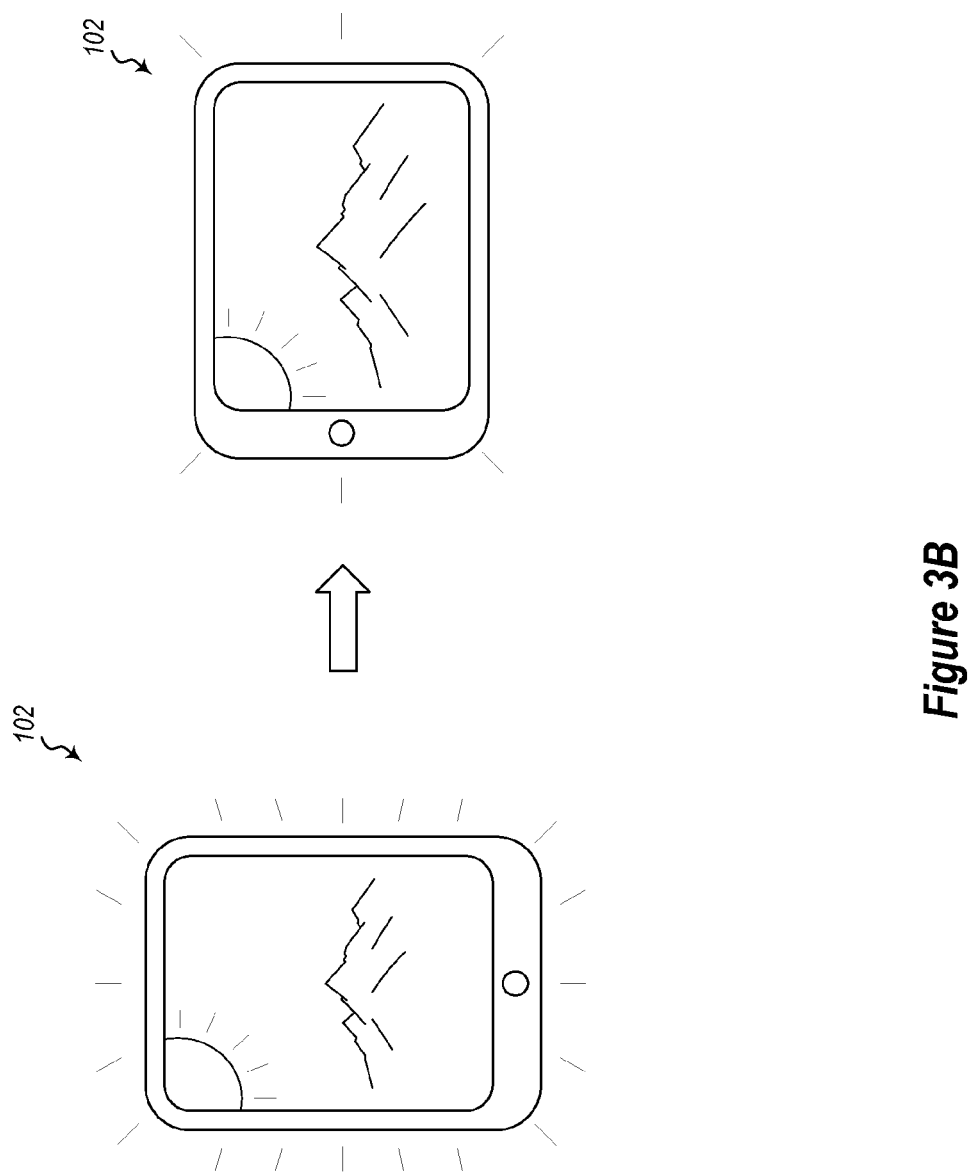
FIG. 3B illustrates a device being rotated.

Reference is now made to FIG. 3B. FIG. 3B illustrates an example where the triggering event may include sensing that a device (or at least the display of the device) is being rotated (e.g., between portrait and landscape). With reference to FIGS. 3B and 4A, the phone 102 may be at the first power level 402 when in portrait mode. While in portrait mode, the power saving event 404 may occur. The phone 102 continues to operate with the display at the first power level 402 while waiting for a triggering event. In this case, the triggering event 406 is the phone 102 being rotated from portrait to landscape. As the image on the display of the phone is rotated, the power output to the display is reduced to the second power level 408.

Figure 3C:
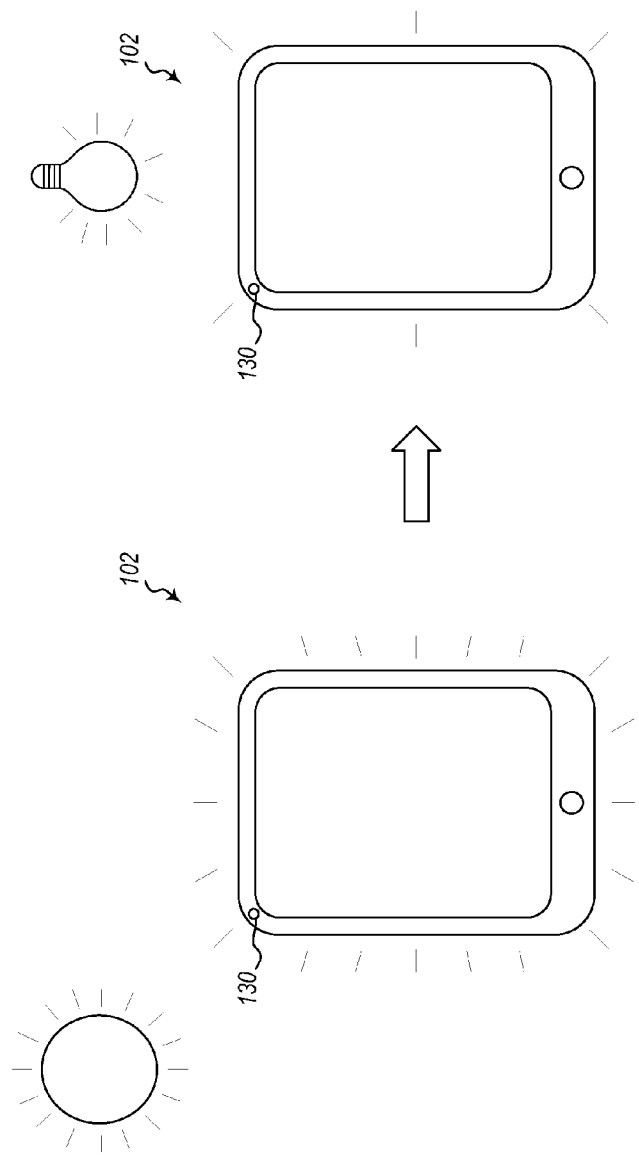
FIG. 3C illustrates a device changing ambient lighting locations.

Reference is now made to FIG. 3C. FIG. 3C illustrates an example where the triggering event may include a change in ambient lighting as indicated by an ambient light sensing algorithm indicating that the display backlight should be decreased or increased. For example, this may occur when transitioning from outside of a building to inside of the building. In particular, typically when a device has an ambient light sensor 130 and control circuitry, power to a display is higher when a device is outside in direct sunlight to overcome glare and washout. Power to the display can be reduced indoors. The example illustrated in FIG. 3C can be understood in the context of the power trace 400 illustrated in FIG. 4B. In particular, while ordinarily when the device moves from outdoors to indoors the power level would be decreased from the first power level 404 to the target power level 410, if a power saving event 404 occurs while the device is outdoors, the device will continue to provide power to the display at the first output power level 402 until the triggering event 406 (in this case moving to an indoor location) occurs. At this point, instead of transitioning the display to the target power level, the power to the display would be reduced even further to the second power level 408 illustrated in FIG. 4B.

FIG. 4C illustrates a trace of what might occur when a device moves from indoors to outdoors. In particular, typically when moving from indoors to outdoors, the power output level to the display would ordinarily be increased from the first output power level 402 to the target output power level 410 illustrated in FIG. 4C. However, if a power saving event 404 is detected while the device is indoors, the device will continue to provide power output to the display at the first power output level while waiting for a triggering event. When the triggering event 406 occurs, in this case moving from indoors to outdoors, power will be increased, but only to the second power output level 408 and not the target power output level 410. Moving back indoors after this transition might cause the power output level to further decrease below the first power output level 402. In alternative embodiments, after the power saving event 404, detection of the triggering event 406 may result in the power level to the display not changing at all. Thus, moving from indoors to outdoors after a power saving event would result in no change to the power level from the first power output level to the display. However, moving back indoors may cause the power output to the display to drop below the first power output level.

Figure 4D:
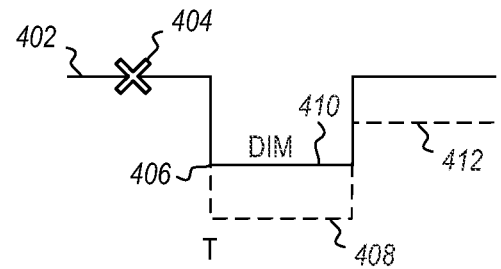
FIG. 4D illustrates another display power trace.

In some embodiments, the triggering event may include the display dimming (e.g., from lack of user input) or the display un-dimming (e.g., when a user interacts with the display device). FIG. 4D illustrates an example where the triggering event is the display dimming. In this example, the display is being provided power at the first power level 402. A power saving event 404 occurs while at the first power level 402. The display continues to be provided power at the first power level 402 until the triggering event 406 (in this case the display device dimming) occurs. While ordinarily the display would dim to the target power level 410, instead the display dims to the second power level 408. If the display were to un-dim, instead of returning to the first power level 402, the display would return to a power level below the first power level 402 as illustrated at 412.

Figure 4E:
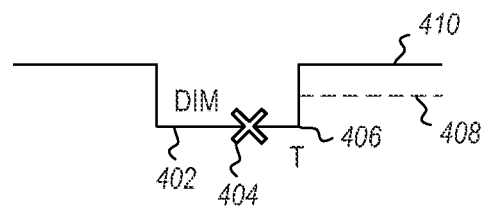
FIG. 4E illustrates another display power trace.

FIG. 4E illustrates an alternative example. In this example, the display dims to the first power level 402. At this level, a power saving event 404 occurs. The display continues to be provided power at the first power level 402. A triggering event 406 occurs, which in this case is the display undimming. However, instead of being powered at the target power level 410, the display is powered at the second power level 408, which is below the target power level 410.

Figure 4F:
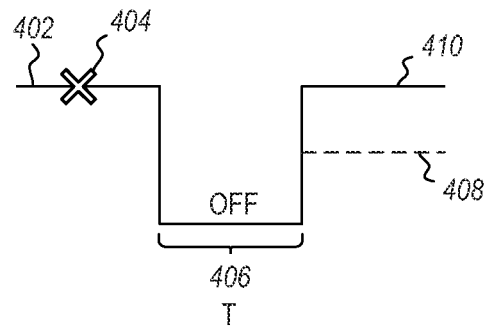
FIG. 4F illustrates another display power trace.

A similar example is illustrated in FIG. 4F, where the triggering event is the display turning off and back on again. Thus, FIG. 4F illustrates the display being powered at the first power level 402. A power saving event 404 occurs. The display continues to be powered at the first power level 402. A triggering event 406 occurs, which in this case is the display powering down and powering back up. As a result, the display is powered at the second power output level 408, which is below a target power level 410, which in this case, is the same level as the first power level 402.

Figure 4G:
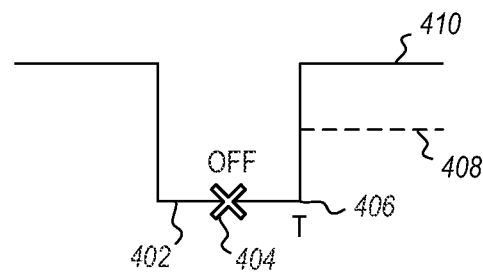
FIG. 4G illustrates another display power trace.

FIG. 4G illustrates an example where the power saving event 404 occurs when the first power level 402 is an off state for the display. In this case, the triggering event 406 is just the display turning back on.

In another example, a triggering event may be when any content-adaptive backlight control indicates that the display backlight should be increased or decreased (e.g., when going from a relative dark image to a lighter image or a relative lighter image to a darker image).

While various triggering events have been discussed and illustrated herein, it should be appreciated that the examples are not exhaustive. Rather, various other alternatives or additions may be implemented with the scope of embodiments of the invention.

Figure 4H:
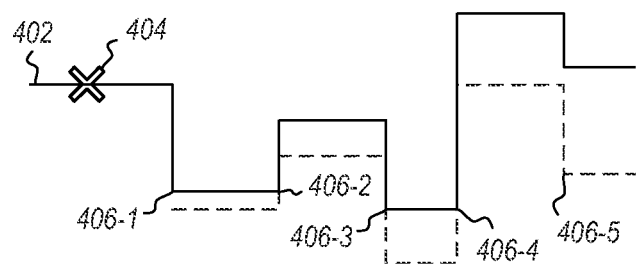
FIG. 4H illustrates another display power trace.
Figure 4I:
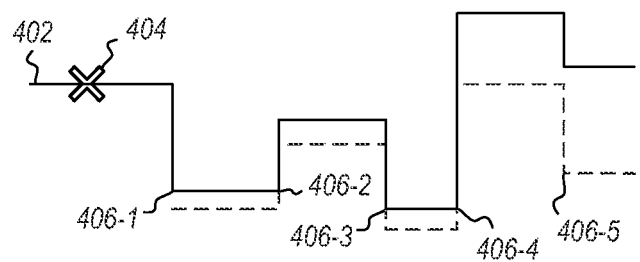
FIG. 4I illustrates another display power trace.

At points in time when triggering events occur, the screen content is already changing, and thus there is an opportunity to change the brightness level without the user necessarily noticing it. Additionally, in some embodiments, the brightness level may be adjusted incrementally at a number of different triggering events. FIGS. 4H and 4I illustrate incremental examples. In particular, FIG. 4H illustrates five uniform increments performed after the power saving event 404 at triggering events 406-1, 406-2, 406-3, 406-4, and 406-5. In contrast, FIG. 4I illustrates five incremental triggering events 406-1, 406-2, 406-3, 406-4, and 406-5, but the increments may be of smaller or greater size depending on the nature of the triggering event.

The smaller the increment, the less likely the user will notice, but it will require more such events to occur before the desired level may be reached. Thus the increment can be statically or dynamically tuned based on one or more factors. One such factor may be a determination of an acceptable number of increments to reach the desired level. More increments may allow for smaller increments. Another factor may be the type of event. For example, for certain events, a user may be more likely to notice the display brightness change during that particular event. For example, when the display is off for a nontrivial amount of time, a large incremental power level change may not be noticed. However, during a display device rotation a large increment would likely be noticed. Another factor may be based on the power level of the battery. In particular, if battery power is sufficiently low, less regard may be given to the noticeability by the user. Rather, it may be more desirable to lower the output power as quickly as possible. Another factor may be based on how successful other (concurrent) remediations have been. Such other remediations may include, for example: throttling the CPU frequency or the number of available CPU cores; throttling the GPU or other offload engines; reducing the frequency or bandwidth to a component such as memory or storage or some sensor; turning off a component such as Wi-Fi or Bluetooth, etc. Another factor may be based on how long it has been since the last increment or the power saving event. Longer times may result in larger increments.

Some embodiments may include a "timeout" where the embodiments stop waiting for a triggering event and instead take a more "noticeable" approach when the power concerns are determined to outweigh the user impact concerns.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
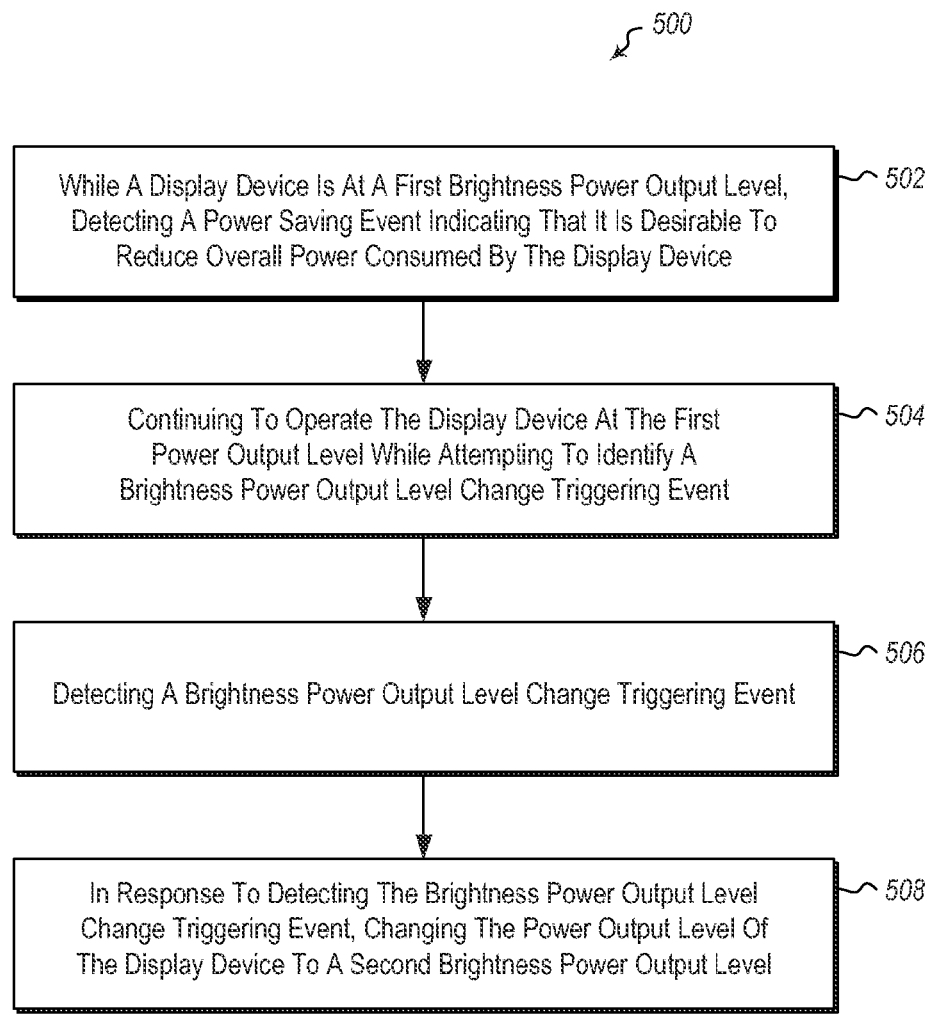
FIG. 5 illustrates a method of automatically changing the brightness of a display device.

Referring now to FIG. 5, a method 500 is illustrated. The method 500 may be practiced in a computing environment and includes acts for automatically changing the brightness of a display device. The method 500 includes while the display device is at a first brightness power output level, detecting a power saving event indicating that it is desirable to reduce overall power consumed by the display device (act 502). For example, embodiments may detect a battery level being at or below a predetermined threshold. Alternatively or additionally, detecting a power saving event may include detecting a device mode (such as airplane mode or wilderness mode) being activated. Alternatively or additionally, detecting a power saving event may include detecting a device being within a particular physical boundary location. Alternatively or additionally, detecting a power saving event may include detecting a user interacting with a graphical user interface element or a hardware user interface element.

The method 500 further includes continuing to operate the display device at the first power output level while attempting to identify a brightness power output level change triggering event. (act 504). The brightness power output level change triggering event is an event that occurs that makes a change to the brightness power output level of the display device less perceptible to a user.

The method 500 further includes detecting a brightness power output level change triggering event (act 506). For example, in some embodiments, detecting a brightness power output level change triggering event includes detecting a device switching between applications or workloads. Alternatively or additionally, detecting a brightness power output level change triggering event includes detecting a device switching between phases of an application. Alternatively or additionally, detecting a brightness power output level change triggering event includes detecting that the display device is being rotated. Alternatively or additionally, detecting a brightness power output level change triggering event includes detecting a change in ambient lighting. Alternatively or additionally, detecting a brightness power output level change triggering event includes the display device dimming or undimming. Alternatively or additionally, detecting a brightness power output level change triggering event includes the display device either turning off or turning on. Alternatively or additionally, detecting a brightness power output level change triggering event includes detecting an indication from a content-adaptive backlight control.

The method 500 further includes in response to detecting the brightness power output level change triggering event, changing the power output level of the display device to a second brightness power output level (act 508).

In some embodiments, the method 500 may be practiced where the first brightness power output level is a higher power output level than the second brightness power output level. However, embodiments may also be implemented where the first brightness power output level is a lower power output level than the second brightness power output level.

In some embodiments, the method 500 further includes changing the power output level of the display device a plurality of times for a single power saving event in response to a plurality of brightness power output level change triggering events. Examples of this are illustrated in FIGS. 4H and 4I above.

Figure 6:
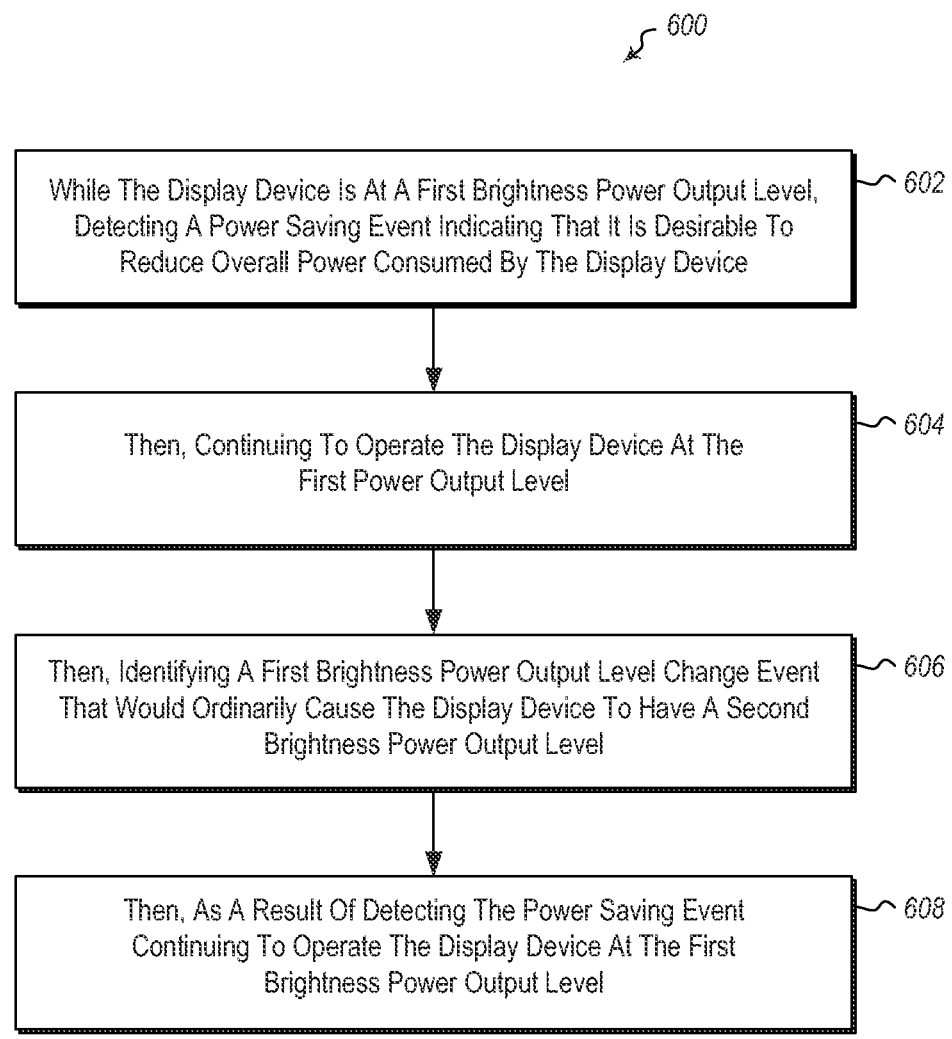
FIG. 6 illustrates a method of managing power output to a display device.

Referring now to FIG. 6, a method 600 is illustrated. The method 600 may be practiced in a computing environment and includes acts for managing power output to a display device. The method 600 includes, while the display device is at a first brightness power output level, detecting a power saving event indicating that it is desirable to reduce overall power consumed by the display device (act 602).

Then, the method 600 further includes continuing to operate the display device at the first power output level (act 604).

Then, the method 600 further includes, identifying a first brightness power output level change event that would ordinarily cause the display device to have a second brightness power output level (act 606).

Then, the method 600 further includes, as a result of detecting the power saving event continuing to operate the display device at the first brightness power output level (act 608).

The method 600 may further include then, detecting a second brightness power output level change event that would ordinarily cause the display device to change from the second brightness power output level to the first brightness power output level and as a result of detecting the power saving event and detecting the second brightness power output level change event, operating the display device at a third power output level that is different than the first power output level.

In some embodiments of the method 600, the third output power level is a lower power level than the first power output level. However, in other embodiments, the third output power level is a higher power level than the first power output level. As illustrated previously, the first brightness power output level change event may include the display device moving from an indoor location to an outdoor location and the second brightness power output level change event include the display device moving from the outdoor location to the indoor location. Alternatively, the first brightness power output level change event may include the display device moving from an outdoor location to an indoor location and the second brightness power output level change event include the display device moving from the indoor location to the outdoor location. Different brightness may occur depending on whether the outdoor to indoor transition (or vice versa) occurs during day or night and is a transition to or from a darkened or illuminated room.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Figure 7:
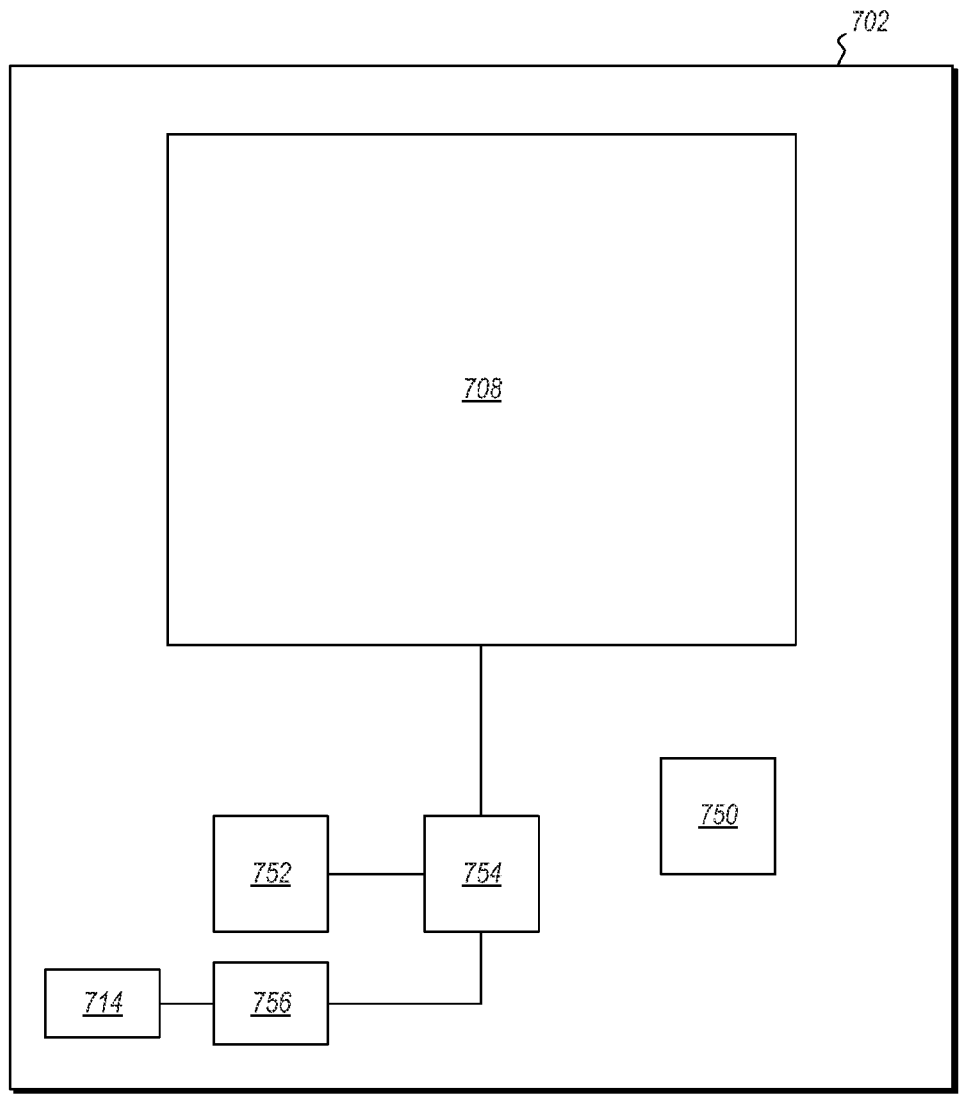
FIG. 7 illustrates a device configured to automatically change the brightness of a display device on the device.

Referring now to FIG. 7, a device 702 is illustrated. The device includes a display device 708. The device 702 also includes one or more processors 750. The one or more processors may be configured to implement various components. For example, the processors may implement a first signal detector 752. While the display device is at a first brightness power output level, the first signal detector is configured to detect a power saving event indicating that it is desirable to reduce overall power consumed by the display device. For example, the signal detector 752 may detect a battery level being at or below a predetermined threshold. Alternatively or additionally the signal detector 752 may detect a device mode (such as airplane mode or wilderness mode) being activated. Alternatively or additionally the signal detector 752 may detect a device being within a particular physical boundary location. Alternatively or additionally the signal detector 752 may detect a user interacting with a graphical user interface element or a hardware user interface element.

The device 702 further includes a brightness level manager 754 which is configured to operate the display device at the first power output level while attempting to identify a brightness power output level change triggering event. The brightness power output level change triggering event is an event that occurs that makes a change to the brightness power output level of the display device less perceptible to a user.

The device 702 further includes a second signal detector 756 which is configured to detect a brightness power output level change triggering event. For example, in some embodiments, detecting a brightness power output level change triggering event includes detecting a device switching between applications or workloads. Alternatively or additionally, detecting a brightness power output level change triggering event includes detecting a device switching between phases of an application. Alternatively or additionally, detecting a brightness power output level change triggering event includes detecting that the display device is being rotated. Alternatively or additionally, detecting a brightness power output level change triggering event includes detecting a change in ambient lighting, such as by detecting ambient lighting changes using the light sensor 714. Alternatively or additionally, detecting a brightness power output level change triggering event includes detecting the display device dimming or undimming. Alternatively or additionally, a brightness power output level change triggering event includes the display device either turning off or turning on. Alternatively or additionally, detecting a brightness power output level change triggering event includes an indication from a content-adaptive backlight control.

The brightness level manager 754 is configured to, in response to detecting the brightness power output level change triggering event, change the power output level of the display device to a second brightness power output level (act 508).

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described, embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of automatically changing a brightness of a display device, the method comprising:
    while the display device is at a first brightness power output level, detecting a power saving event indicating that it is desirable to reduce overall power consumed by the display device;
    as a result of detecting the power saving event, continuing to operate the display device at the first brightness power output level while attempting to identify a brightness power output level change triggering event, the first brightness power output level change triggering event is an event that is at least one of a change in ambient lighting or a change in screen output of the display device, the brightness power output level change triggering event is an event which masks changes to brightness power output level of the display device;
    detecting the brightness power output level change triggering event; and
    in response to detecting the brightness power output level change triggering event and the power saving event, changing the a the first brightness power output level of the display device during the brightness power output level change triggering event from the first brightness power output level to a second brightness power output level.

2. The method of claim 1, wherein detecting the power saving event comprises detecting a battery level being at or below a predetermined threshold.

3. The method of claim 1, wherein detecting the power saving event comprises detecting a device mode being activated.

4. The method of claim 1, wherein detecting the power saving event comprises detecting a device being within a particular physical boundary location.

5. The method of claim 1, wherein detecting the power saving event comprises detecting a user interacting with a graphical user interface element or a hardware user interface element.

6. The method of claim 1, wherein detecting the brightness power output level change triggering event comprises detecting a device switching between applications or workloads.

7. The method of claim 1, wherein detecting the brightness power output level change triggering event comprises detecting a device switching between phases of an application.

8. The method of claim 1, wherein detecting the brightness power output level change triggering event comprises detecting that the display device is being rotated.

9. The method of claim 1, wherein detecting the brightness power output level change triggering event comprises detecting the change in the ambient lighting.

10. The method of claim 1, wherein detecting the brightness power output level change triggering event comprises detecting the display device either dimming or undimming.

11. The method of claim 1, wherein detecting the brightness power output level change triggering event comprises detecting the display device either turning off or turning on.

12. The method of claim 1, wherein detecting the brightness power output level change triggering event comprises detecting an indication from a content-adaptive backlight control.

13. The method of claim 1, wherein the first brightness power output level is higher than the second brightness power output level.

14. The method of claim 1, further comprising changing the first brightness power output level of the display device a plurality of times for a single power saving event in response to a plurality of brightness power output level change triggering events to incrementally change the first brightness power output of the display device from the first brightness power output level to a different brightness power output level.

15. In a computing environment, a method of managing power output to a display device, the method comprising:
while the display device is at a first brightness power output level, detecting a power saving event indicating that it is desirable to reduce overall power consumed by the display device;
then, as a result of detecting the power savings event, continuing to operate the display device at the first brightness power output level;
then, identifying a first brightness power output level change triggering event that would ordinarily cause the display device to have a second brightness power output level where the first brightness power output level change triggering event is an event that is at least one of a change in ambient lighting or a change in screen output of the display device, the first brightness power output level change triggering event is an event which masks changes to a brightness power output level of the display device; and
then, as the result of detecting the power saving event continuing to operate the display device at the first brightness power output level.

16. The method of claim 15 further comprising:
then, detecting a second brightness power output level change triggering event that would ordinarily cause the display device to change from the second brightness power output level to the first brightness power output level; and
then, as the result of detecting the power saving event and detecting the second brightness power output level change triggering event, operating the display device at a third brightness power output level that is different than the first brightness power output level.

17. The method of claim 16, wherein the third brightness output power level is lower than the first brightness power output level.

18. The method of claim 16, wherein the first brightness power output level change triggering event comprises the display device moving from an indoor location to an outdoor location and wherein the second brightness power output level change triggering event comprises the display device moving from the an the outdoor location to the indoor location.

19. A device comprising:
a display device;
one or more hardware processors configured to implement on the display device:
a first signal detector that is configured to, while the display device is at a first brightness power output level, detect a power saving event indicating that it is desirable to reduce overall power consumed by the display device;
a brightness level manager configured to continue to operate the display device at the first brightness power output level while, as a result of the power saving event, attempting to identify a brightness power output level change triggering event, where the brightness power output level change triggering event is an event that is at least one of a change in ambient lighting or a change in screen output of the display device, the brightness power output level change triggering event is an event which masks changes to brightness power output level of the display device;
a second signal detector that is configured to detect the brightness power output level change triggering event; and
wherein the brightness level manager is configured to, in response to detecting the brightness power output level change triggering event and the power saving event, change the brightness power output level of the display device during the brightness power output level change triggering event from the first brightness power output level to a second brightness power output level.

20. The device of claim 19, wherein the device further comprises a light sensor, and wherein the brightness power output level change triggering event comprises the change in the ambient lighting.

* * * * *